(12) United States Patent
Nichols

(10) Patent No.: US 8,095,423 B2
(45) Date of Patent: Jan. 10, 2012

(54) INTERACTIVE INTERNATIONAL BULK TRADE TELEVISION

(76) Inventor: Grant Allen Lee Nichols, Woodsfield, OH (US)

(*) Notice: Subject to any disclaimer, the term of this patent is extended or adjusted under 35 U.S.C. 154(b) by 1839 days.

(21) Appl. No.: 11/308,354

(22) Filed: Mar. 17, 2006

(65) Prior Publication Data
US 2007/0233592 A1 Oct. 4, 2007

(51) Int. Cl.
*G06Q 30/00* (2006.01)
(52) U.S. Cl. .................. 705/26.1; 705/26.7
(58) Field of Classification Search .......... 705/26, 705/27, 26.1, 26.7; 725/60
See application file for complete search history.

(56) References Cited

U.S. PATENT DOCUMENTS

| | | | | |
|---|---|---|---|---|
| 5,677,708 | A | 10/1997 | Matthews, III et al. | 345/684 |
| 5,758,328 | A * | 5/1998 | Giovannoli | 705/26 |
| 5,826,241 | A * | 10/1998 | Stein et al. | 705/26 |
| 5,930,769 | A | 7/1999 | Rose | 705/27 |
| 6,061,095 | A | 5/2000 | Van Gestel | 348/74 |
| 6,543,052 | B1 * | 4/2003 | Ogasawara | 725/60 |
| 6,772,433 | B1 | 8/2004 | LaJoie et al. | 725/52 |
| 7,013,289 | B2 | 3/2006 | Horn et al. | 705/26 |
| 2002/0161630 | A1 * | 10/2002 | Kern et al. | 705/14 |
| 2004/0010452 | A1 * | 1/2004 | LaCour | 705/26 |

FOREIGN PATENT DOCUMENTS

KR 2004017542 * 2/2004

* cited by examiner

*Primary Examiner* — Yogesh C Garg
(74) *Attorney, Agent, or Firm* — Louis Ventre, Jr.

(57) ABSTRACT

The invention is a method for advancing international trade in bulk goods and related services employing interactive international video broadcasting medium. The broadcaster enters a contract (110) with a manufacturer for listing a product for bulk sales on an international broadcasting medium and authorizing the broadcaster to be a surety for payment and delivery of said product, to receive payment from the buyer and to make a net payment to the manufacturer on the terms of the purchase. The broadcaster then broadcasts the listing (120) on the interactive international video broadcasting medium, which enables viewers to place an order (130) for the product on the specified terms and conditions. Any order is then conveyed to the manufacturer (140) for acceptance. The broadcaster, as surety, accepts payment for accepted orders (150). The broadcaster then transmits the net payment to the manufacturer (160) upon satisfaction of the terms and conditions of the sale, or to the buyer for unsatisfied (170) terms and conditions.

2 Claims, 1 Drawing Sheet

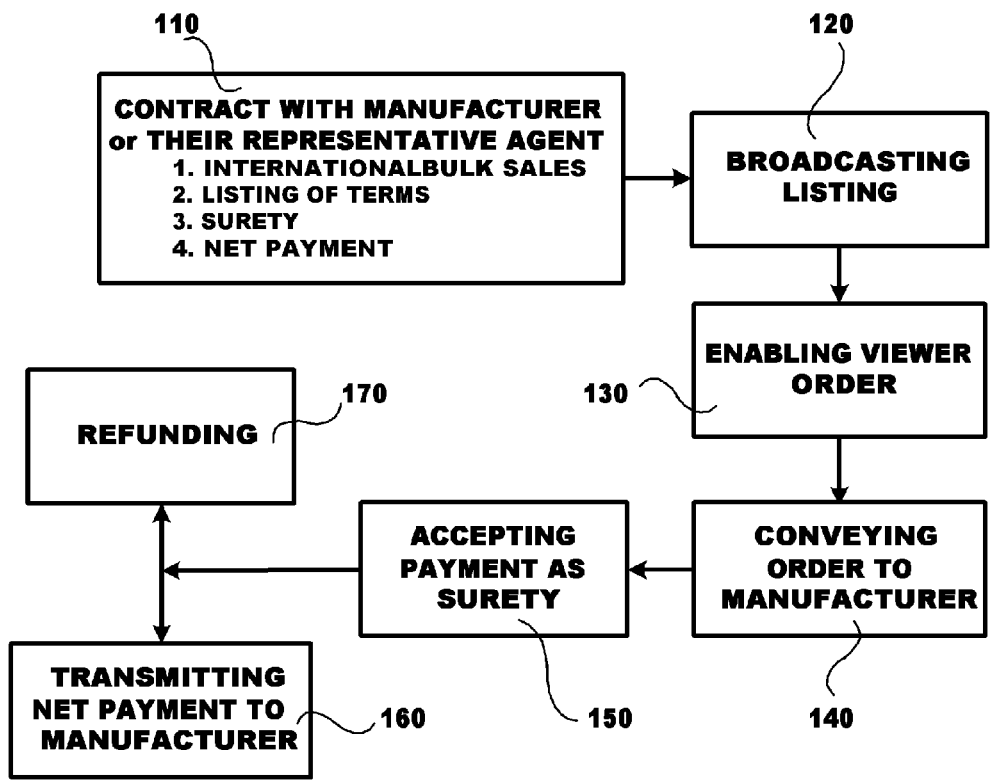

INTERACTIVE INTERNATIONAL BULK TRADE TELEVISION

FIELD OF INVENTION

In the field of interactive television broadcasting, the invention is a method for promoting trade in international bulk goods and related services. The method permits businesses and individuals to profit from bulk sales to third parties and that provides a trustworthy means to identify the availability of bulk products, place orders, pay for orders with payment held in escrow, arrange for shipping and dispense the payment once the goods are received.

DESCRIPTION OF PRIOR ART

Electronic Internet shopping systems are known. However, none overcome the immense barriers facing those seeking to import and export bulk goods while combining the powerful visual stimulus of television as the descriptive and interactive medium. Also, most Internet electronic shopping systems are directed to singular or small quantity purchases. The present invention is focused on bulk purchases from manufacturers, typically at wholesale and most suitable to business-to-business transactions, rather than seller to end-user.

Internet systems have been proposed to organize global commerce, but require computer navigational skills and are not oriented to providing video to make it easy for viewers to understand and make a bulk purchase. U.S. Pat. No. 7,013,289 to Michel Horn, et al. on Mar. 14, 2006 is such a global electronic commerce system proposed for the Internet. While employing conventional Internet systems, Horn does not disclose the use of dedicated television broadcasting. Further, the '289 patent does not teach a means for viewers to become middlemen in a bulk sales transaction. The present invention includes a step permitting individuals viewing the availability of goods and services to identify a market for a supply of goods and become commissioned agents for bulk sales or simply profit from a markup over the manufacturer's price.

Representative of the prior art in electronic shopping is U.S. Pat. No. 6,543,052 to Nobuo Ogasawara on Apr. 1, 2003. The '052 patent teaches an electronic shopping system using an Internet shopping system hosted on a television-set-top-box combination. The '052 patent employs a remote controller with voice recognition capabilities interacts with the set-top box. Data input to an Internet shopping web program accessed through the set-top box's web browser and orders are placed by the individual for one or more objects. The present invention is further distinguished from the '052 invention in that it involves bulk goods and related services through international commerce, and introduces the broadcaster into a surety role where both buyer and seller in different countries can have confidence in seeing that what is purchased will be delivered and what is paid will actually be delivered to the supplier. In addition, the present invention includes a step permitting individuals viewing the availability of goods and services to identify a market for a supply of goods and become commissioned agents for bulk sales or simply profit from a markup over the manufacturer's price.

In an increasingly global economy, a need exists for a means to facilitate international sales of bulk goods and related services in a visual video medium. It is an object of the invention to set forth a process for cutting through the substantial barriers to locating international suppliers and quickly identifying and navigating the regulatory maze incident to purchasing and shipping goods through international commerce. Essentially, international trade television broadcasting is a new process that simplifies international trade. It is, for example, an all in one, one-stop international trade television station, broadcasting international trade video information via satellite, the Internet and video telephones. In this embodiment, it is an interactive television station that allows buying and selling of bulk goods internationally via television.

Accordingly, the present invention will serve to improve the prior art by creating (1) an interactive television medium to identify the international availability of bulk goods and related services; (2) a mechanism to address the regulatory and administrative hurdles incident to international purchase and delivery of bulk goods, (3) a medium that empowers every viewer to become an instrument or agent of sale and earn a profit therefor; and, (4) the means for assuring the bona fides of international buyer and seller.

BRIEF SUMMARY OF THE INVENTION

The invention is a method for advancing international trade in bulk goods and related services employing interactive television broadcasting. The broadcaster enters a contract with a manufacturer for listing a product for bulk sales on an international broadcasting medium. The listing contains a description of the product and terms and conditions for a willing buyer to acquire international delivery to the buyer. The contract authorizes the broadcaster to be a surety for payment and delivery of said product, to receive payment from the buyer and to make a net payment to the manufacturer on the terms of the purchase. The net payment is the gross amount paid by the buyer less any commission payable by the manufacturer. The broadcaster then broadcasts the listing on the interactive international television and viewers interact by examining information and placing an order for the product on the specified terms and conditions. Any order is then conveyed to the manufacturer for acceptance. The broadcaster accepts payment for accepted orders from the buyer. The manufacturer receives confirmation of payment and delivers the product to the buyer. The broadcaster then transmits the net payment to the manufacturer upon satisfaction of the terms and conditions of the sale.

BRIEF DESCRIPTION OF THE DRAWINGS

The drawing is a block diagram of the steps in the method of the preferred embodiment of the invention.

DETAILED DESCRIPTION

The steps of the preferred embodiment of the invention are shown in the drawing in their most logical sequence. However, the invention includes performing these steps in any order suitable to consummating a sale of bulk goods and related services in international commerce.

The method advances international trade in bulk goods and related services by employing interactive television broadcasting or video telephone or some combination of video media. The foremost example is an interactive television station broadcasting programming dedicated to facilitating international trade and capable of receiving viewer input. This foremost example is used herein, but should not be construed to limit the international video-broadcasting medium.

Interactive television broadcasting ideally would be capable of providing continuous programming on the subject of international trade, and also provide, on demand from a viewer, textual, audio and other video information on any subject relative to international trade. The more complete the information available from the interactive medium, the better the medium will be in meeting the intended scope of this invention and its purpose in advancing international trade. In an alternative embodiment, interactive international television broadcasting enables transmission of an international trade lead ticker identifying buying and selling opportunities.

The invention contemplates that a very broad cross-section of manufacturers around the world will be interested in listing their products for bulk purchase by viewers of broadcast television. Bulk purchases are most likely to be business-to-business transactions, although other transactions are possible, for example business to individuals who are interested in bulk purchases, that is purchases in quantities of more than one.

The listing of products is preferably a part of a centralized database of bulk products from manufacturers who desire to make international sales of products. This database preferably includes other international trade related information. Interactive international television broadcasting is preferably exclusively dedicated to information related to international trade. Examples of such information are rules, regulations, government contacts, contact information for international trade agencies, government export assistance, grants for international trading, loans available for international purchases, currency conversion, international shippers, insurance agents, freight forwarders, international lawyers, customs brokers, discount opportunities, news concerning international trading, conferences, and trade events, and educational documentaries on international trading.

Referring to the drawing, the first logical step shown in the drawing is entering a contract with a manufacturer or their representative agent (110) for listing a product for bulk sales on an interactive international video broadcasting medium. This would typically be done either at the instigation of the broadcaster, or upon inquiry from a manufacturer desiring to market products in bulk through international commerce.

The contractual instrument is intended to be a convenient and enforceable means for stipulating the obligations of the parties pursuant to a listing in the interactive broadcasting medium. Key among these are a commitment to bulk sales of the manufacturer's product, a description of the product suitable for broadcasting, the terms and conditions incident to the sale, the willingness of the manufacturer to permit the broadcaster to be a surety in sale, the payment to the broadcaster for the sale, and the delivery of the net payment to the manufacturer upon meeting the terms and conditions of the purchase.

The contract would specify the intent to cover bulk sales of product. This would preferably be at wholesale prices suitable for delivery direct from a manufacturer. Here the type of purchaser might be restricted to a business if that were a limitation imposed by the manufacturer.

The contract would require the manufacturer to describe the products available for bulk purchase by a broadcast viewer. A purpose of the invention is to promote the international sale of goods and related services. Incident to that purpose is providing relatively complete information for a purchaser to be informed of the product available for purchase. The manufacturer also has an interest in attracting a purchaser and providing sufficient information to attract the purchaser to the manufacturer's product.

The contract would require the manufacturer to set forth the terms and conditions for a willing buyer to acquire international delivery to said buyer of the product in bulk. The price or tiered prices for quantity delivery, shipping costs, return policy, handling of defects, and any other terms set down by the manufacturer.

The contract would require the manufacturer to authorize the broadcaster to be a surety for payment and delivery of said product. The broadcaster as a reliable intermediary who holds the funds of the transaction until purchase conditions are satisfied is intended to be the means to raise the confidence of both buyer and seller that they will not be defrauded. The method of the invention overcomes a significant impediment to international transactions, which is the formidable burden imposed by having to enforce a contract through unfamiliar legal processes in the manufacturing or purchasing jurisdiction. In the surety role, the broadcaster holds the purchase payment, which assures the manufacturer that it will be paid upon compliance with the purchase agreement. It also assures the buyer that he will receive the purchased bulk goods on the terms of the sale, or be able to get a substantial refund. While the contract would require the manufacturer to accept the broadcaster's role as surety, the purchaser is not required to accept that role for the broadcaster.

In the event that broadcaster is the surety in the purchase transaction, broadcaster would be required to make the net payment to the manufacturer upon manufacturer meeting the terms of the sale. The net payment is the payment received from the buyer less any commission payable by manufacturer.

Compensation to the broadcaster would be part of the contract terms. Typically, payment would be in the form of an up front fee for the listing, or a commission based on the total purchase price or some combination thereof. In the preferred embodiment, the payment mechanism would be part of the terms requiring net payment to the manufacturer.

The next step in this embodiment is broadcasting the listing (120) on an interactive international video-broadcasting medium. The broadcaster would maintain the listing and all related information and broadcast that listing and information to a broad spectrum of viewers, preferably making it available on-demand for viewer access 24 hours a day.

The next step in this embodiment is enabling a viewer of said interactive international video broadcasting medium to place an order (130) for said product on the specified terms and conditions. The more viewers, the better the potential for the viewer engaging the interactive listing to place an order and conclude a bulk purchase of manufactured products and related services.

The next step in this embodiment is conveying the order to the manufacturer (140) for acceptance. The manufacturer may decide not to accept an order for any number of reasons. Once accepted, however, the order will be placed and a sales contract effectively consummated.

The next step in this embodiment is the broadcaster as surety accepting payment (150) for said goods from the viewer.

The next step in this embodiment is transmitting the net payment to the manufacturer (160) upon satisfaction of the terms and conditions of the sale. Payment would be made once the conditions of the sale have been made. Preferably, this would be at the acceptance of delivery of the bulk goods by the purchaser. If the terms of the sales agreement were not met, the broadcaster would instead settle the dispute with the power to make a full or partial refund (170) to the viewer.

In an alternative embodiment, the contract further authorizes viewers of the interactive international video-broadcasting medium to find third-party purchasers for manufacturer's goods and profit from such third party purchaser. Profit may be through commissions or through a markup over manufacturer's price. By empowering viewers to effectively be agents of the manufacturer to broker purchases of manufacturer's goods, or simply to sell at a markup, the manufacturer, the viewer and the broadcaster benefit from a sale that might otherwise not be made and greatly multiplies the potential of the manufacturer to profit from sales of product. This authorization empowers viewers to profit from their efforts in business.

The above-described embodiments including the drawing are examples of the invention and merely provide illustrations of the invention. Other embodiments will be obvious to those skilled in the art. Thus, the scope of the invention is determined by the appended claims and their legal equivalents rather than by the examples given.

What is claimed is:

1. A method of commissioning an agent engaging in international trade in bulk goods and services comprising the steps of:
    (a) providing an interactive television station configured to broadcast video programming;
    (b) creating a video listing for bulk sale of goods or services comprising terms and conditions;
    (c) broadcasting the video listing on the interactive television station to an interactive television configured to display the video listing;
    (d) broadcasting on the interactive television station on-demand access to regulations governing the international purchase and delivery of the goods or services in the video listing through the interactive television;
    (e) receiving a request through the interactive television, the request comprising commissioning the requester as an agent of a manufacturer on a specific bulk sale consistent with the video listing;
    (f) conveying an order comprising the request to the manufacturer for acceptance;
    (g) accepting payment for the specific bulk sale; and
    (h) transmitting payment to the manufacturer and commissioned agent.

2. The method of claim 1 wherein the video listing is part of a centralized database that includes bulk products available for purchase through the interactive television.

* * * * *